US006363412B1

(12) United States Patent
Niwa et al.

(10) Patent No.: US 6,363,412 B1
(45) Date of Patent: Mar. 26, 2002

(54) WIRELESS COMMUNICATION METHOD PERMITTING EFFICIENT USE OF SYSTEM RESOURCES

(75) Inventors: Yushi Niwa; Hidehiro Matsumoto, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/196,539

(22) Filed: Nov. 20, 1998

(30) Foreign Application Priority Data

Nov. 21, 1997 (JP) .............................................. 9-321250

(51) Int. Cl.[7] .............................................. G06F 15/16
(52) U.S. Cl. ........................ 709/203; 709/202; 709/206; 709/217; 709/229; 709/238; 709/239; 455/4.1; 455/412; 455/414; 455/463
(58) Field of Search ................................ 709/200–203, 709/205–206, 217–218, 227–229, 236–239; 455/3.1–3.2, 4.1, 412–414, 461–466

(56) References Cited

U.S. PATENT DOCUMENTS

| | | | | |
|---|---|---|---|---|
| 5,742,905 A | * | 4/1998 | Pepe et al. ................... | 455/461 |
| 5,802,312 A | * | 9/1998 | Lazaridis et al. ........... | 709/238 |
| 5,903,723 A | * | 5/1999 | Beck et al. .................. | 709/203 |
| 5,905,865 A | * | 5/1999 | Palmer et al. ............... | 709/217 |
| 5,948,066 A | * | 9/1999 | Whalen et al. .............. | 709/229 |
| 5,951,636 A | * | 9/1999 | Zerber ......................... | 709/202 |
| 6,009,462 A | * | 12/1999 | Birrell ......................... | 709/206 |
| 6,052,735 A | * | 4/2000 | Ulrich et al. ................ | 709/236 |
| 6,061,729 A | * | 5/2000 | Nightingale ................. | 709/203 |
| 6,119,167 A | * | 9/2000 | Boyle et al. ................. | 709/203 |
| 6,188,909 B1 | * | 2/2001 | Alanara et al. .............. | 455/466 |

FOREIGN PATENT DOCUMENTS

| | | | | |
|---|---|---|---|---|
| JP | 7183824 | 7/1995 | ............ | H04B/1/40 |
| JP | 8139747 | 5/1996 | ............ | G06F/12/00 |

* cited by examiner

Primary Examiner—Zarni Maung
Assistant Examiner—Bharat Barot
(74) Attorney, Agent, or Firm—Ostrolenk, Faber, Gerb & Soffen

(57) ABSTRACT

A communication method for a wireless transmission network having a plurality of terminals and a central server, disclosed in the context of an E-mail system. The source terminal sends only a mail header identifying the message source, the destination and other attribute information to the server. The destination terminal receives the digital data directly from the source terminal when desired after first downloading the mail header from the server. Thus, a data recipient can reduce unnecessary communication cost and storage resources in the server and in the system, can be saved.

23 Claims, 9 Drawing Sheets

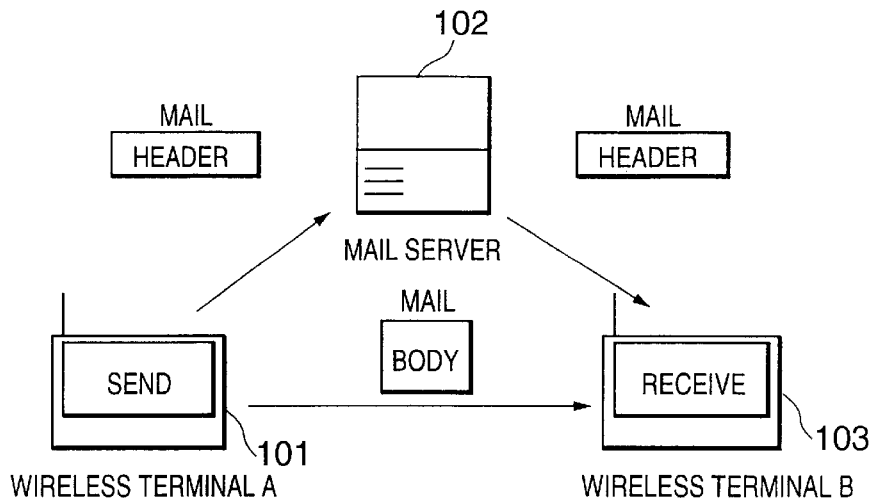
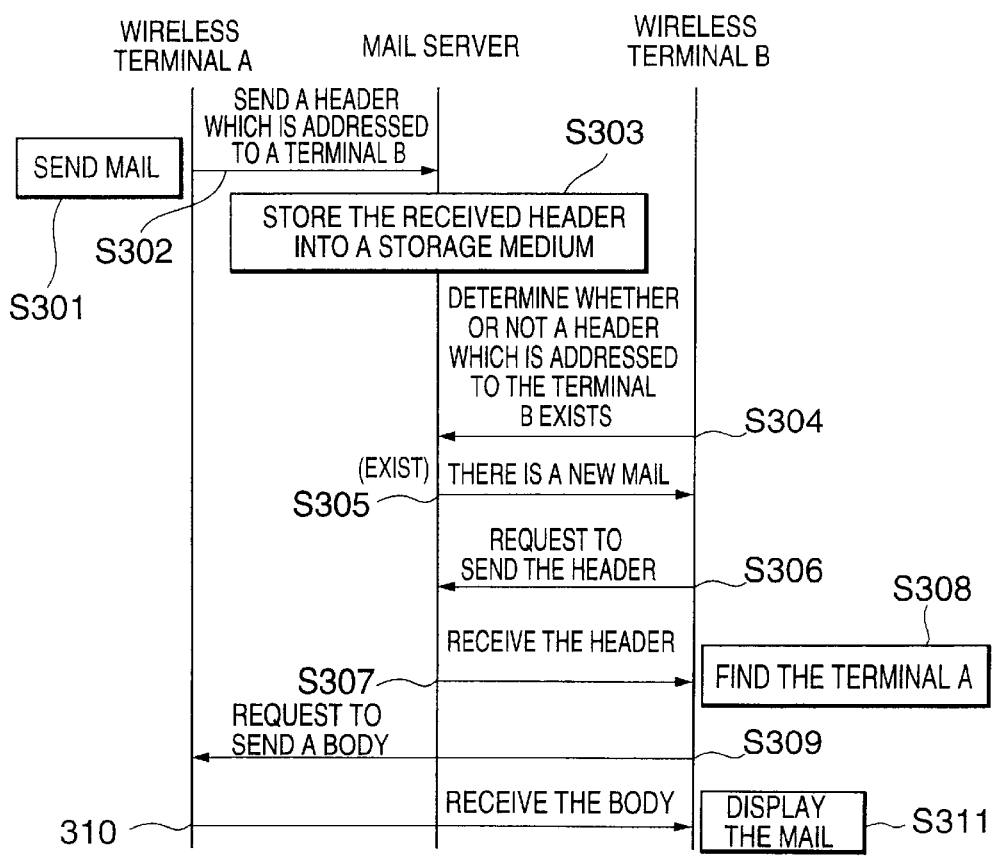

FIG. 13

MAIL HEADER

| 4BYTE | 4BYTE | 4BYTE | 6BYTE | 4BYTE | 1BYTE |
|---|---|---|---|---|---|
| SOURCE ADDRESS | DESTINATION ADDRESS | SIZE OF MAIL BODY | TITLE | MAIL ID | FLAG |
| 0x85C80001 | 0x85C80002 | 0x15E0 | "THIS IS THE RESPONSE TO THE OTHER DAY'S QUESTION" | 0x0970041E | 0x00 |

CURRENT DATE/TIME : 1997.08.22.09:17

| DESTINATION ADDRESS | CONNECTION DATA/TIME | DISCONNECTION DATE/TIME |
|---|---|---|
| 0x85C20009 | 1997.08.20.22:11 | 1997.08.20.22:15 |
| 0x85C2001F | 1997.08.20.22:11 | 1997.08.20.22:15 |
| 0x85C20020 | 1997.08.20.22:11 | 1997.08.20.22:15 |
| 0x85C20011 | 1997.08.20.22:11 | 1997.08.20.22:15 |
| 0x85C20002 | 1997.08.20.22:11 | 1997.08.20.22:15 |
| 0x85C20001 | 1997.08.20.22:11 | 1997.08.20.22:15 |

DESCENDING ORDER OF TIME

WIRELESS COMMUNICATION METHOD PERMITTING EFFICIENT USE OF SYSTEM RESOURCES

BACKGROUND OF THE INVENTION

1. Field of the Invention

This invention relates to a wireless data transfer method and system and, in particular, to a communication system, such as an electronic mail system, which carries out sending/receiving digital data between a plurality of terminals through a wireless transmission network in a network computer system.

2. Description of the Related Art

A wide variety of communication systems have been proposed to send/receive digital data between a plurality of wireless terminals included in a wireless computer network which is controlled by a computer network.

Among others, one type of mail sending/receiving system has widely prevailed. In this connection, such mail sending/receiving systems will be described with reference to FIGS. 1 and 2. FIG. 1 schematically shows an example of a conventional mail sending/receiving system. FIG. 2 shows a procedure based on a protocol used for sending/receiving a mail or mail data in each conventional mail sending/receiving system.

At first, description will be directed to a first one of the conventional mail sending/receiving systems.

It is assumed that a mail (mail data) includes a mail header and a mail body. When a wireless terminal is used for an electronic mail system in a LAN (local area network) through a wireless communication network (for example, a mobile radio telephone network) a wireless terminal A 201 sends both a mail header and a mail body addressed to a wireless terminal B 203 to a mail server 202 (S402). Next, the mail server 202 stores the mail header and the mail body which are received (S403). The wireless terminal B 203 can connect to the mail server 202 in anytime, and when the wireless terminal B 203 determines that the mail header and/or the mail body addressed to it exist in the mail server 202 (S404, S405), it receives the mail header and/or the mail body from the mail server 202 (S406, S407). A wireless electronic mail receiving system which has been disclosed in Japanese Laid Open Publication No. HO8-139747 is similar in structure to the first conventional system.

It is a problem that, in a mail sending/receiving system as the first conventional system, a recipient of a mail cannot know contents of the mail until a wireless terminal B completes the reception of a mail header and a mail body of the mail. In other words, when a recipient wants to know contents of a mail, a wireless terminal B must receive both of a mail header and a mail body from the mail server. Even if the recipient does not need the mail or does not want to receive the mail, the mail header and the mail body of the mail are transferred to the wireless terminal B. Consequently, during the transfer, a wireless transmission network is used as transmission network and the recipient is to be charged according to the duration of use of the transmission network.

Such a problem becomes serious when a size of the mail header for each mail becomes small (for example, the size is about 10 through 100 bytes) and a size of the mail body for each mail becomes large. For example, a transmission time of about 14 minutes is needed for the transfer when the size of mail body is as long as 1 megabytes if transmission is carried out from a standard communication device which has a transmission rate of 9,600 bit per second (1 byte=8 bits). The above transmission time is measured on the assumption that disconnection neither takes place due to interference during the transmission time executed by the recipient nor any retry operation is repeated.

When disconnection occurs during reception of the mail body, the reception operation must be repeated by the recipient. A probability of occurrence of radio-frequency interference, which is one of the reasons for disconnection, is generally kept constant over the whole transfer time. However, during successive data transmission, as the data size becomes large, the probability of occurrence of the radio-frequency interference becomes high during transmission. As a result, the recipient often wastes money when the network is used for providing service of the network connection serve provider during a transmission time.

In a system, such as the first conventional system, when a sender sends a great deal of mail information to a lot of recipients in the form of an advertising direct mail, some or most of the recipients might neither need such mail information nor want to see the mail. This brings not only about a serious economical loss but also wastes a network resource.

On the contrary, if a mail body of about 1,000 through 5,000 bytes is received, a recipient does not suffer an economical loss since a cost for the reception of such a short mail body is as small as a cost for the reception of the mail header.

It is assumed that an account operation is carried out at every one of six seconds while a mail header and a mail body of 5,000 bytes are received for one second and five seconds, respectively. Under the circumstances, if a recipient receives only the mail header, the recipient pays for using the network for six seconds although he or she uses the network for one second. On the other hand, when the recipient receives both the mail header and the mail body, the recipient also pays for charges for using the network for six seconds. In the later case, the recipient does not pay for extra money, since it takes just six seconds to receive the mail header and the mail body.

Next, a second conventional system will be described with respect to the Figures of the first conventional system.

The second conventional system functions in the same way as the mail sending/receiving method shown in FIG. 1. In the second conventional system, a wireless terminal A 201 sends a mail including a mail header and a mail body to a mail server 202. Next, when a wireless terminal B 203 receives the mail, the wireless terminal B 203 receives only the mail header. If a user which received the mail header determines that the mail is necessary, the wireless terminal B 203 receives the remaining mail body.

According to the second conventional system, when the wireless terminal B 203 need not receive the mail body, it can instruct the mail server 202 to delete the mail body in the mail server 202. Therefore, the second conventional system can reduce traffic in a transmission network between the mail server 202 and the wireless terminal B 203 by eliminating transferring unnecessary mail data between them. This is one of the merits in the second conventional system, as compared to the first conventional system. An electronic mail delivery system which has been disclosed in Japanese Laid-Open Publication No. HO1-236541 is similar to the second conventional system.

Here, for the sake of clarity, it is assumed that the wireless terminal A 201 sends a mail and the wireless terminal B 203 receives the mail in the above description. However, it is readily understood that the wireless terminal B 203 also can send a mail to the wireless terminal A 201 by exchanging functions of the above two terminals.

The mail sending/receiving system according to the second conventional system can overcome the problem in the first conventional system to some extent.

In the system, the wireless terminal B at first receives only a mail header on reception of the mail information from the mail server. Then, a recipient can determine whether or not a mail body is necessary for the recipient by referring to a size of the mail body, a title, and so on included in the mail header. Therefore, the recipient can select only necessary mail information to be received and may pay a reduced fee as compared to the first conventional system.

However, the second conventional system can not favorably cope with sending a large number of mails. Specifically, when a wireless terminal A simultaneously sends a plurality of destinations, such as over 1,000 terminals, mail information including a plurality of mails each of which includes a mail header and a mail body similar to one another all storage regions in a mail server is occupied with the mail headers and the mail bodies because all of the mail headers and the mail bodies which are produced in the wireless terminal A are once sent to the mail server.

This situation may occur when a large amount of commercial direct mails are produced and are transmitted by automatically replacing only destinations in the mail header and recipient names in the mail header. All the wireless terminals each of which corresponds to a destination of a mail do not immediately receive or delete the mail headers. In other words, the wireless terminals can individually receive or delete them in each timing assigned to each of the corresponding recipients.

When a large amount of mail information is simultaneously sent to the mail server, as mentioned before, all of the mail information or a part of the mail has been received in the mail server and kept in the mail server for a long time. As a result, a storage resource are wasted in the mail server.

Furthermore, the second conventional system has another disadvantage. Herein, let the wireless terminal A send a large amount of mail headers and mail bodies to a plurality of destinations, such as over 1,000 terminals in the above-mentioned case. Under the circumstances, all of the mail headers and mail bodies are stored in the mail server through the wireless transmission network between the wireless terminal A and the mail server. Furthermore, when the wireless terminals B each of which corresponds to one of the destinations receive the corresponding mail (including a mail header and a mail body), the mail is sent through a wireless transfer network between the mail server and receiving wireless terminal as similar to when it is stored in the mail server.

Therefore, providing that a mail header and a mail body which are sent by the wireless terminal A are received by the wireless terminal B, in the mail sending/receiving system according to the first and the second conventional system, the mail header and the mail body occupy the wireless transmission network twice on transmission and reception of the mail.

For example, when the mail body is less than or equal to 5,000 bytes in size, no problem takes place in connection with occupation of the memory. However, when the mail body becomes large in size, the memory resource is largely occupied in the whole mail system.

In addition, a wireless terminal device is also disclosed in Japanese Laid-Open Publication No. II07-183824. In the wireless terminal device, wireless terminals (A and B) are turned on only when the wireless terminals automatically communicate with each other, and turned off when they complete their communication. This device is useful for saving power in batteries included in the wireless terminals.

At any rate, this device still wastes power in the batteries because each wireless terminal is activated and connected to the mail server for communication, even if no information for simultaneous communication is present in both the mail server and each wireless terminal.

SUMMARY OF THE INVENTION

It is therefore an object of the invention to provide a wireless terminal device which is capable of solving the above-mentioned problems.

It is a specific object of the invention to provide a method of reducing a fee which results from reception of unnecessary mail information.

It is another object of the invention to provide a method of reducing both resources of a wireless transmission network occupied in the whole system and storage resources occupied in a center-machine (server).

It is still another object of the invention to provide a method of suspending communication automatically according to degradation of quality of a wireless network or requests for the network by a user, and restarting the communication automatically so as to achieve data transmission without fail.

It is still another object of the invention to provide a method suspending communication automatically and for saving a resource of battery power of a wireless terminal.

According to the invention, in a wireless data transfer method for sending/receiving digital data between terminals via a center-machine by using a wireless transmission network, the method comprising the steps of sending a mail header including attribute information of the digital data from a source terminal to the center-machine and receiving the digital data by a destination terminal from the source terminal when the digital data is determined to be necessary by referring to the mail header in the center-machine is provided.

Furthermore, the attribute information of the digital data includes an ID identifying the source terminal, a size of the digital data, a title of the digital data, and an ID identifying the digital data.

BRIEF DESCRIPTION OF THE DRAWINGS

FIG. 3 schematically shows a block diagram of a mail sending/receiving system according to an embodiment of the invention;

FIG. 4 shows a time chart for use in describing a procedure based on a protocol used for the sending/receiving system illustrated in FIG. 3;

FIG. 13 schematically shows header information in one embodiment of the invention;

DESCRIPTION OF THE PREFERRED EMBODIMENT

Figure 1:
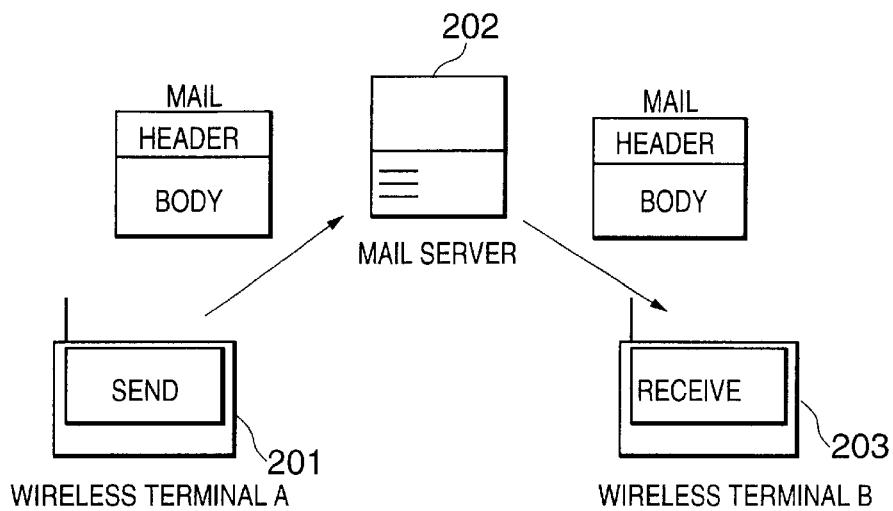
FIG. 1 schematically shows a block diagram for use in describing conventional mail sending/receiving systems.
Figure 2:
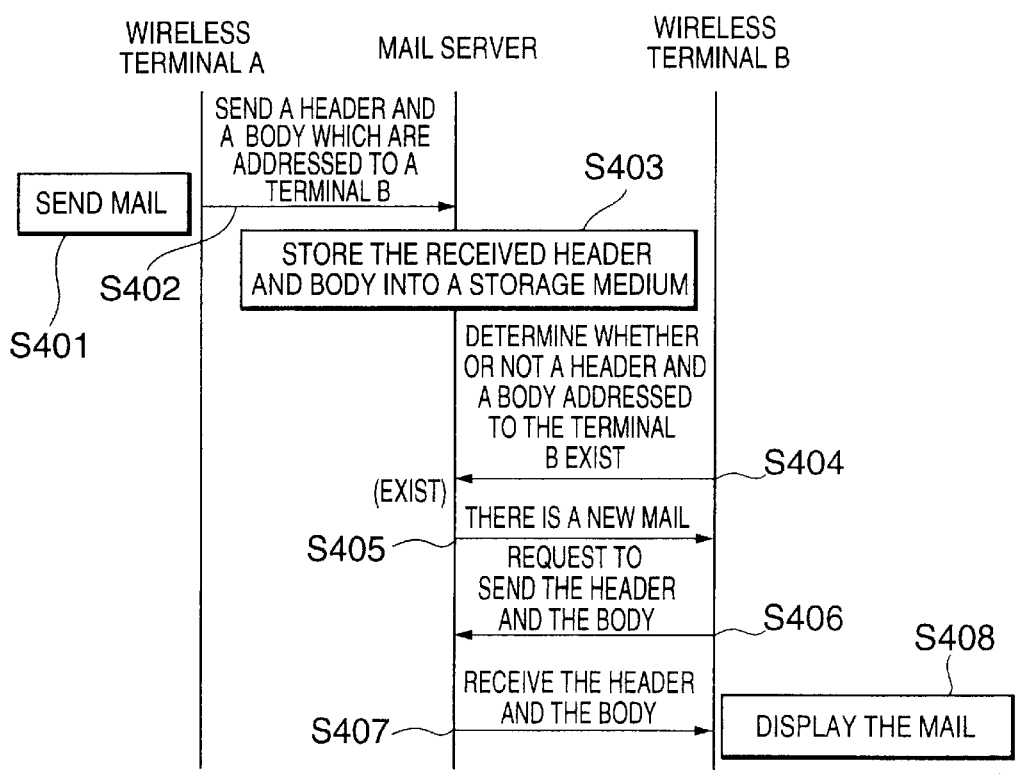
FIG. 2 shows a time chart for use in describing a procedure based on a protocol used for the conventional sending/receiving systems.

Hereinafter, description of the invention will be made with reference to accompanying drawings.

FIG. 3 schematically shows a communication system, namely, a sending/receiving system according to an embodiment of the invention. For convenience of explanation, it is assumed that the illustrated sending/receiving system is used to send/receive an electronic mail (simply called a mail hereinafter) and to carry out wireless data transfer or wireless data communication and that the mail is composed of a mail header and a mail body. However, the present invention can be also applied to the other file transfer systems among a plurality of wireless terminals.

In the sending/receiving system shown in FIG. 3, it is to be noted that a wireless terminal A 101 sends only a mail header to a mail server 102 when a mail produced in the wireless terminal A 101 is to be sent to a wireless terminal B 103. Furthermore, the wireless terminal B 103, after receiving the mail header from the mail server 102, directly receives a mail body corresponding to the mail header from the wireless terminal A 101.

Next, the above embodiment of the invention will be described in more detail with reference to FIG. 4 which shows a procedure based on a protocol used in the sending/receiving system according to the embodiment of the invention.

At first, the wireless terminal A 101 generates a mail (S301) to be sent to the wireless terminal B 103 (S301). In this event, the wireless terminal A 101 sends only a mail header of the mail to the mail server 102 (S302). Then, the mail server 102 stores the mail header in a memory therein (S303). Next, the wireless terminal, namely, a receiving terminal B 103 accesses the mail server 102 and determines whether or not a mail header addressed to the terminal B 103 is stored in the mail server 102 (S304).

Here, if a mail header addressed to the wireless terminal B 103 is present in the mail server 102, the mail server 102 notifies the wireless terminal B 103 of existence of the mail header (S305). The wireless terminal B 103 of requests the mail server 102 to send the mail header to the wireless terminal B 103 in response to the notification (S306). The mail server 102 sends the mail header to the wireless terminal B 103 in response to the request (S307). Consequently, the wireless terminal B 103 can find that a source terminal of the mail header is the wireless terminal A 101 by referencing to contents in the mail header (S308). Then, the wireless terminal B 103 connects to the wireless terminal A 101, and request the wireless terminal A 101 to send a mail body corresponding to just received mail header to the wireless terminal B 103 (S310). The wireless terminal A 101 sends the mail body to the wireless terminal B 103 in response to the request.

By a series of steps described above, the wireless terminal B 103 can store the mail body in its own memory or storage, and can display the mail body to a user of the wireless terminal B 103 (S311).

In this specification, the wireless terminal A 101 sends a mail, and the wireless terminal B 103 receives the mail for convenience of explanation. However, even if the wireless terminal B 103 sends a mail to the wireless terminal A 101, both of the wireless terminals (B 103, A 101) can be appropriately operate as the sending and receiving terminals, respectively, by exchanging function of each wireless terminal.

Next, each element in the embodiment of the invention will be described.

Figure 10:
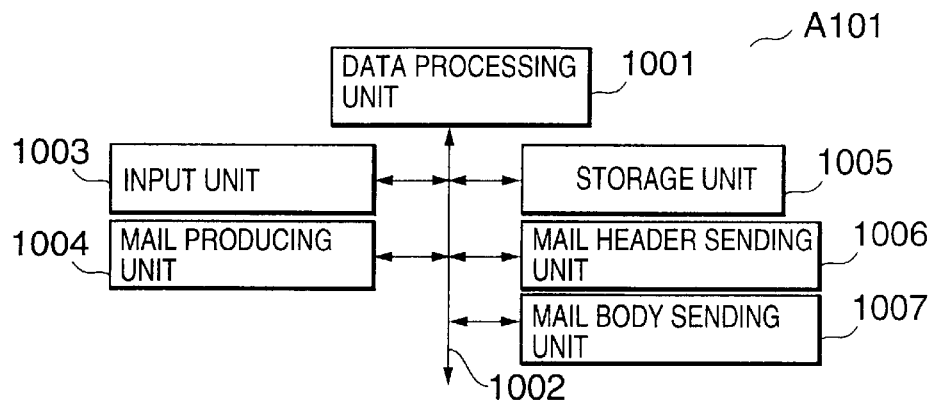
FIG. 10 shows a block diagram of a wireless terminal A in one embodiment of the invention.

The wireless terminal A 101 shown in FIG. 3 can be configured as shown in FIG. 10 and may be similar in structure to B103, although description will be restricted to the wireless terminal A101 alone. The wireless terminal A 101 includes a data processing unit 1001 which is connected to each unit described below via bus 1002 and controls the units. Among the units, a mail producing unit 1004 is used to draft and edit a mail by a user while a storage unit 1005 stores a mail which is produced or which is being produced. In addition, an input unit 1003 is operable to receive an instruction of sending the mail from the user while a mail header sending unit 1006 serves to read a mail from the storage unit 1005 in response to an instruction of sending the mail from a user and to send a mail header of the mail to a mail server 102 by the use of a wireless transmission network. Furthermore, a mail body sending unit 1007 serves to send a mail body to a mail server, or to a wireless terminal which can be connected to the wireless terminal A 101 via a wireless transmission network and which is indicated by any receiving address. The mail body sending unit 1007 can divide a mail body into any pieces and send the pieces when a size of the mail body exceeds a predetermined size.

Figure 11:
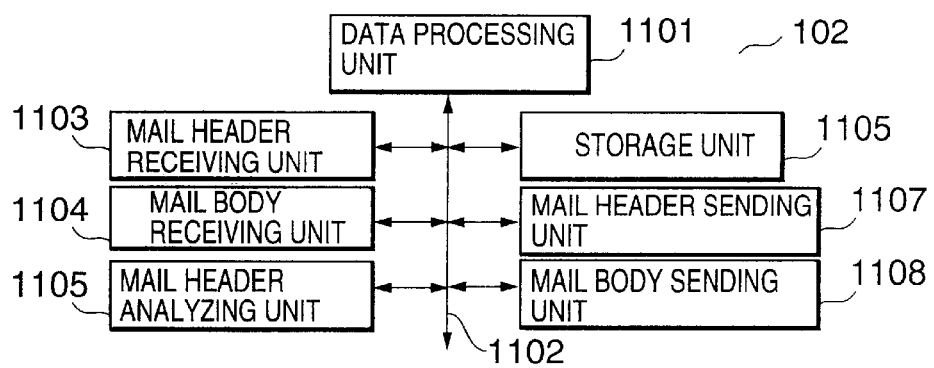
FIG. 11 shows a block diagram of a mail server in one embodiment of the invention.

The mail server 102 shown in FIG. 3 is structured in a manner shown in FIG. 11. The mail server 102 includes a data processing unit 1101 which is connected to each unit described below via a bus 1102 and controls the units. The illustrated mail server 102 includes, as the units, a mail header receiving unit 1103 which receives a mail header from a wireless terminal A 101 via a wireless transmission network, a mail body receiving unit 1104 which receives a mail body from a wireless terminal A 101 via a wireless transmission network, a storage unit 1106 which stores a mail header and a mail body which is received, a mail header analyzing unit 1105 which reads the received mail header from the storage unit 1006 and compares contents in the mail header with any conditions, a mail header sending unit 1107 which sends a mail header using a wireless transmission network to a wireless terminal B 103 in response to a request from the wireless terminal B 103, and a mail body sending unit 1108 which sends a mail body to a wireless terminal B 103.

Figure 12:
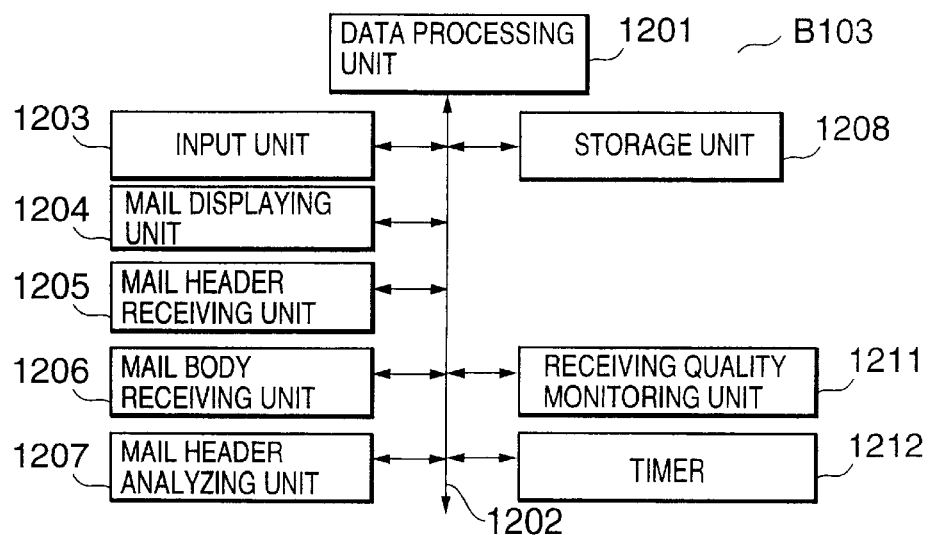
FIG. 12 shows a block diagram of a wireless terminal B in one embodiment of the invention.

The wireless terminal B 103 shown in FIG. 3 can be designed as shown in FIG. 12. The wireless terminal B 103 includes a data processing unit 1201 which is connected to each unit described below via a bus 1202 and controls the units. In addition, the illustrated wireless terminal B103 includes, as the units, a mail header receiving unit 1205 which determines whether or not a mail header addressed to the wireless terminal B 103 existing the mail server 102 to receive the mail header via a wireless transmission network on existence of the mail header in the mail server 102, and a mail body receiving unit 1206 which receives the mail body corresponding to the mail header via a transmission network from the mail server 102, or from a wireless terminal which can be connected to the wireless terminal which can be connected to the wireless terminal B 103 and which is indicated by any sending address. Moreover, the illustrated wireless terminal B 103 further includes a storage unit 1208 which stores the received mail header and the mail body, a mail header analyzing unit 1207 which obtains header information, such as a sending address or a size of the mail body from the received mail header, a timer 1212 which times any duration and notifies the data processing unit 1201 of passage of time by using interrupt, a mail displaying unit 1204 which displays the received mail header and the mail body to a user, and an input unit 1203 which receives an instruction to operate from a user, and receiving quality monitoring unit 1211 which monitors the status of a battery for data receiving and a radio wave.

Furthermore, the receiving quality monitoring unit 1211 monitors a receiving quality which is specified by a difference a checksum derived from a data received in receiving a mail body and a checksum appended to the received data. In the illustrated receiving quality monitoring unit 1211, status of power is monitored by detecting whether or not a power supply voltage of the wireless terminal B 103 is lower than a certain threshold voltage and a radio field intensity is also monitored by detecting whether or not intensity of the receiving radio wave is below a certain threshold intensity. Here, a checksum, for example, means a value of a least significant byte of a summation obtained by adding all bytes in a length of a data flow.

The mail body receiving unit 1206 can treat data sent in the form of a plurality of divided mail data as a mail body by concatenating a plurality of divided mail data after the reception.

The mail header sending unit (1006,1007) and the mail body sending unit (1007,1008) generally cooperate with a communication device such as a modem to transfer data based on a conventional lower layer communication protocol, which has been defined by a known protocol, such as PPP (point to point protocol (RFC 1331: RFC=Request for Comment)). Therefore, more detail description for basic function will be omitted hereinafter.

In the embodiment of the invention, the following description thus far been made about when a mail header is sent, what contents the mail header has, or where the mail header is sent. Similar description will be true of the mail body.

Next, processing in the embodiment of the invention will be schematically described with reference to the accompanying drawings.

Figure 6:
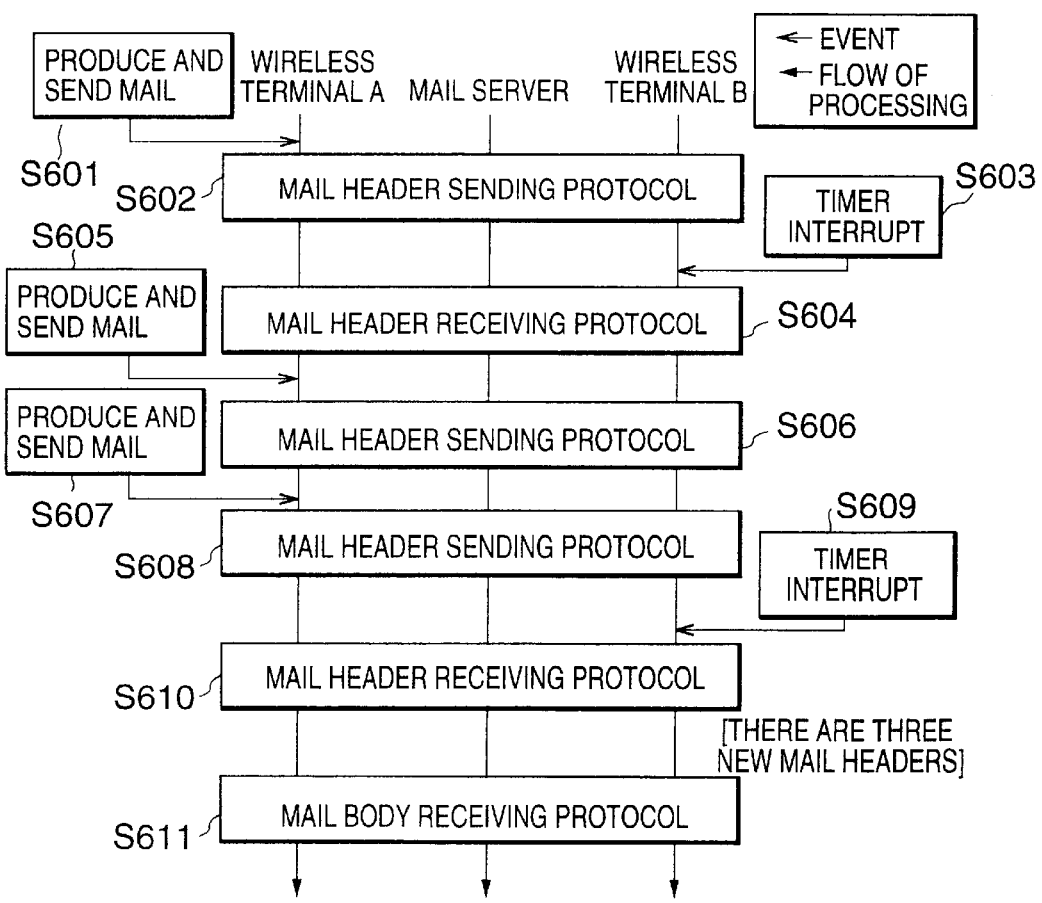
FIG. 6 shows a variation of a procedure based on a processing protocol in one embodiment of the invention.

Referring to FIGS. 3 and 6, description will be made about the procedure based on a processing protocol in the embodiment. As shown in FIG. 3, it is assumed that the wireless terminal A 101 sends the mail to the wireless terminal B 103 and the mail server 102 intermediates between the wireless terminal A 101 and the wireless terminal B 103.

Figure 5:
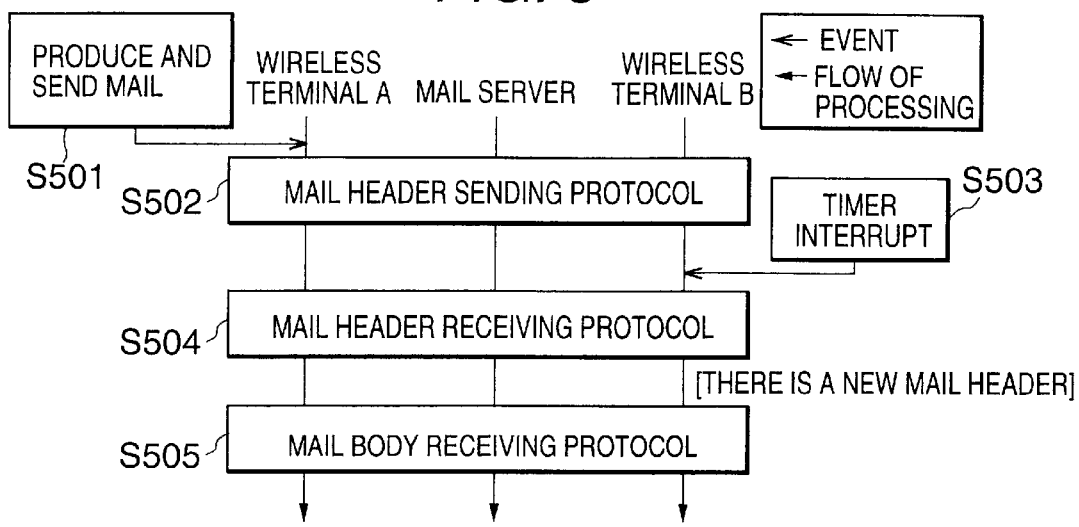
FIG. 5 schematically shows a procedure based on a processing protocol in one embodiment of the invention.

As shown in FIG. 5, firstly, the wireless terminal A 101 produces a mail from a user, and sends it to the mail server 102 (S501). Next, the wireless terminal A 101 commences a procedure which is based on the mail header sending protocol (S502) between the wireless terminal A 101 and the mail server 102, supposing the mail server 102 is connected to the wireless terminal A 101. In the procedure based on the mail header sending protocol (S502), a mail header in the mail to be sent to the wireless terminal B 103 is sent from the wireless terminal A 101 to the mail server 102, and the wireless terminal A 101 notifies the mail server 102 that the wireless terminal A 101 stores a mail body in the mail addressed to the wireless terminal B 103.

After completion of the mail header sending protocol (S502), the wireless terminal B 103 begins to connect to the mail server 102 by responding to a trigger signal, such as timer interrupt signal (S503), and starts the procedure which is based on a mail header receiving protocol (S504) so as to determine whether or not a mail header addressed to the wireless terminal B 103 exists in the mail server 102. Here, if the wireless terminal B 103 receives the mail header from the mail server 102, the wireless terminal B 103 detects a new mail (header) addressed to the wireless terminal B 103.

When the new mail header addressed to the wireless terminal B103 in the mail server 102 is detected in accordance with the procedure based on the mail header receiving protocol (S504), the wireless terminal B 103 immediately starts procedure which is based on a mail body receiving protocol (S505).

However, as shown in FIG. 6, even if the wireless terminal B 101 finds that there is a mail header addressed to the wireless terminal B 103 in the mail server 102 by using a procedure based on a mail header receiving protocol (S604), the wireless terminal B 011 does not immediately start procedure which is based on a mail body receiving protocol (SG11). For example, as shown in FIG. 6, the wireless terminal A 011 may start procedure which is based on the mail body receiving protocol (SG11) on any condition such as when three new mail headers have been received.

In FIG. 5, the wireless terminal B 103 finds a new mail header addressed to wireless terminal B 103 in the mail server 102 by using procedure which is based on the mail header receiving protocol (S504). After that, the wireless terminal B 103 immediately receives a mail body corresponding to the new mail header from the wireless terminal A 101 or from the mail server 102 by using procedure which is based on the mail body receiving protocol (S505).

Furthermore, procedures based on each protocol will be described with reference to accompanying drawings.

More detail description about the procedure based on the mail header sending protocol (S502) will be made with reference to FIG. 7 which shows the procedure based on the mail header sending protocol (S502) in detail. The procedures based on the mail header sending protocol (S602, S606, S608) shown in FIG. 6 are also similar to the procedure shown in FIG. 7.

In the wireless terminal A 101, a user produces a mail by the mail producing unit 1004 (S701) and instructs to send the mail by the use of the input unit 1003 (S703), and then a series of steps is started. Under the circumstances, it is assumed that the mail server 102 is ready for receiving a mail header from a wireless terminal connected to the mail server 102 (S702).

The wireless terminal A 101 sends a mail header to the mail server 102 through a wireless telephone network connected between the wireless terminal A 101 and the mail server 102 by using the mail header sending unit 1006 (S704). The mail server 102 receives the mail header by using the mail header receiving unit 1103.

Temporarily referring to FIG. 13, the mail header has a plurality of data fields and at least includes a source address, a destination address, a size of mail body, a title, a mail ID, and a flag arranged in the data fields. The source address (=0x85c80001(HEX)) is an address for identifying a wireless terminal A 101. The destination address (=0x85c80002 (HEX)) is an address identifies a wireless terminal B 103. The size of a mail body (=0x15E0(HEX)) is a size of mail body corresponding to a mail header including these elements. The title (="This is the response to the other day's question"(character strings)) is a title or the first any characters of a mail body corresponding a mail header including these elements. The mail ID (=0x970041E(HEX)) is an ID of this mail header itself, and is used for identifying a mail body corresponding to this mail header. The mail ID is a number produced in the wireless terminal A 101, and is not duplicate the other mail ID in the wireless terminal A 101. The flag (−0x00(HEX)) can include the other information, however, in this embodiment, contents of the flag is defined as follows.

In this embodiment, if the flag in the mail header is 1×01(HEX), it shows that the wireless terminal A 101 requests that the mail body is unconditionally sent to the mail server 102 immediately after the mail header is sent. If the flag in the mail header is 0×00(HEX), it shows that the wireless terminal A 101 entrusts the mail server 102 with determination whether or not the mail body should be sent to the mail server 102.

Figure 7:
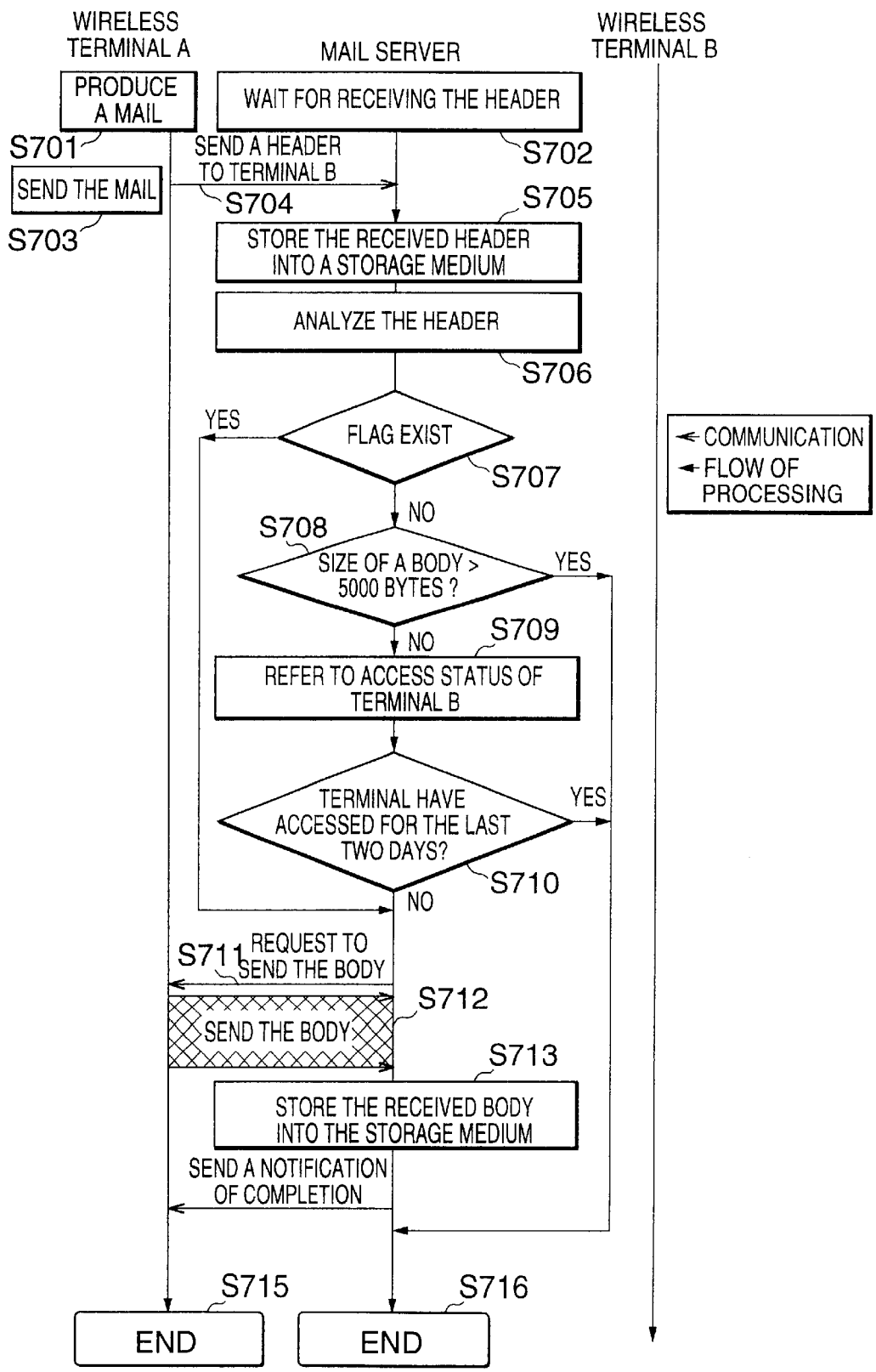
FIG. 7 shows a procedure based on a protocol for sending a mail header in one embodiment of the invention.

In FIG. 7, the mail server 102 once stores the received mail header into a storage medium in the mail server 102 by using the storage unit 1106 (S705). Next, the mail server 102 analyzes contents of the mail header by using the mail header analyzing unit 1105 (S706). If a value of the flag in the mail header is 0×01(HEX), such a situation is referred to "the flag exists", the mail server 102 skips the following steps (S708 to S710) and immediately requests the wireless terminal A 101 to send a mail body to the mail server 102 (S711).

In the step S707, if a value of the flag in the mail header is 0×00(HEX), i.e., "the flag does not exist", the mail server 102 determines a size of the mail body (S708). If the size of the mail body exceeds 5,000 bytes, the mail server 102 immediately ends the procedure which is based on the mail header sending protocol (S502) (S716). In a similar manner, the wireless terminal A 101 ends the procedure (S715).

If the size of the mail body is smaller than 5,000 bytes, the mail server 102 checks the past access status information pertaining to the wireless terminal B 103 which is designated as a destination (S709).

The access status information is stored in a storage medium in the mail server 102, and automatically updated each time when access operation is made from each terminal.

Figures 14, 15:
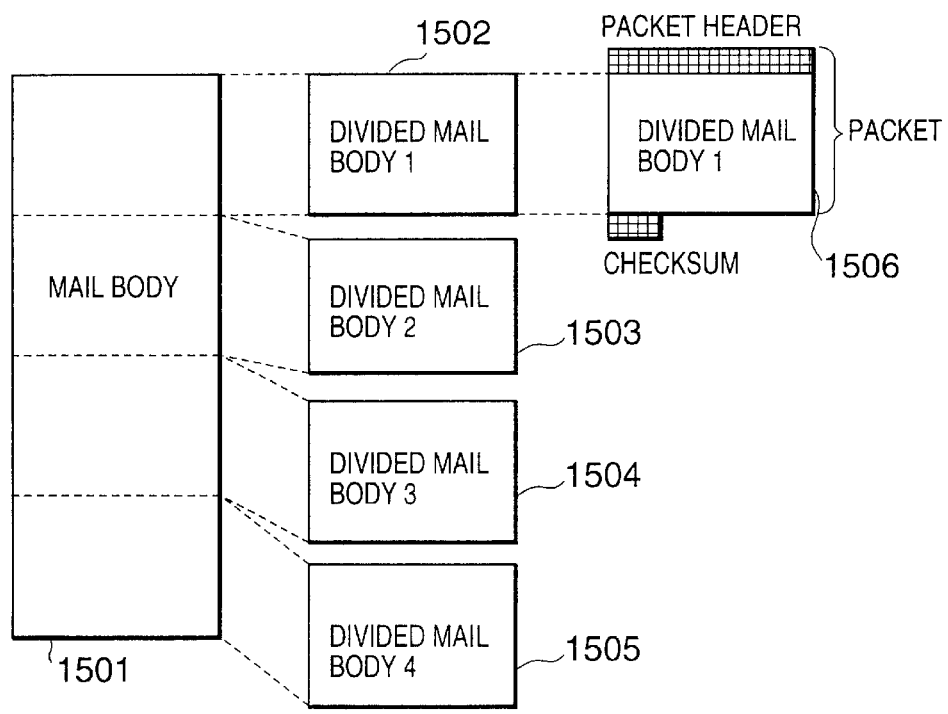
FIG. 14 schematically shows access status information in one embodiment of the invention.
FIG. 15 schematically shows divisions of a mail body in one embodiment of the invention.

Referring to FIG. 14, the access status information is exemplified which is used for the access operation to the mail server 102. As shown in FIG. 14, the access status information generally includes a destination address which is used for identifying a destination terminal, a connection date/time standing for a date/time at which the terminal begins to connect to the mail server 102, and a disconnection date/time standing for a date/time at which the terminal ends the connection. Also, the access status information can be stored in several forms according to a storing unit for storing the information.

In this embodiment, since the wireless terminal B 103 (which has an address of 0×85C80002(HEX)) is a destination terminal, the access status information in FIG. 14, which is representative of the current date/time of "1997. 08. 22. 09:17" and which is representative of the fact that the wireless terminal B 103 had been connected to the mail server 102 for a duration from "1997. 08. 20. 22:11" to "1997. 08. 20. 22:15". Therefore, the wireless terminal B 103 has ever accessed to the mail server 102 for the last two days. The mail server 102, when recognizes the fact, immediately ends the procedure which is based on the mail header sending protocol (S502) (S706). Simultaneously, the wireless terminal A 101 also ends the procedure (S715).

When the wireless terminal B 103 have not accessed to the mail server 102 at least for the last two days (S710), the mail server 102 determines that the wireless terminal B 103 have suspended a mail sending/receiving operation recently for some reason. In such a situation, the mail server 102 determines that probability is not high that the wireless terminal B 103 receives a mail body from the wireless terminal A 101, for example, in two or three days. Therefore, to reduce a load to the wireless terminal A 101, the mail server 102 moves the mail header from the wireless terminal A 101 to a storage of itself.

In FIG. 7, when the mail server 102 requests the wireless terminal A 101 to send the mail body to the mail server 102 (S711), in response to the request, the wireless terminal A 101 sends the mail body to the mail server 102 by using the mail body sending unit 1007 (S712). The mail server 102 requests the mail body (S711), receives the mail body (S712), stores the received mail body into a storage medium (S713), and sends a notification of completion of reception to the wireless terminal A 101 by using the mail body receiving unit 1104 (S714). Next, the wireless terminal A101 and the mail server 102 ends each procedure based on the mail header sending protocol (S715, S716).

Figure 8:
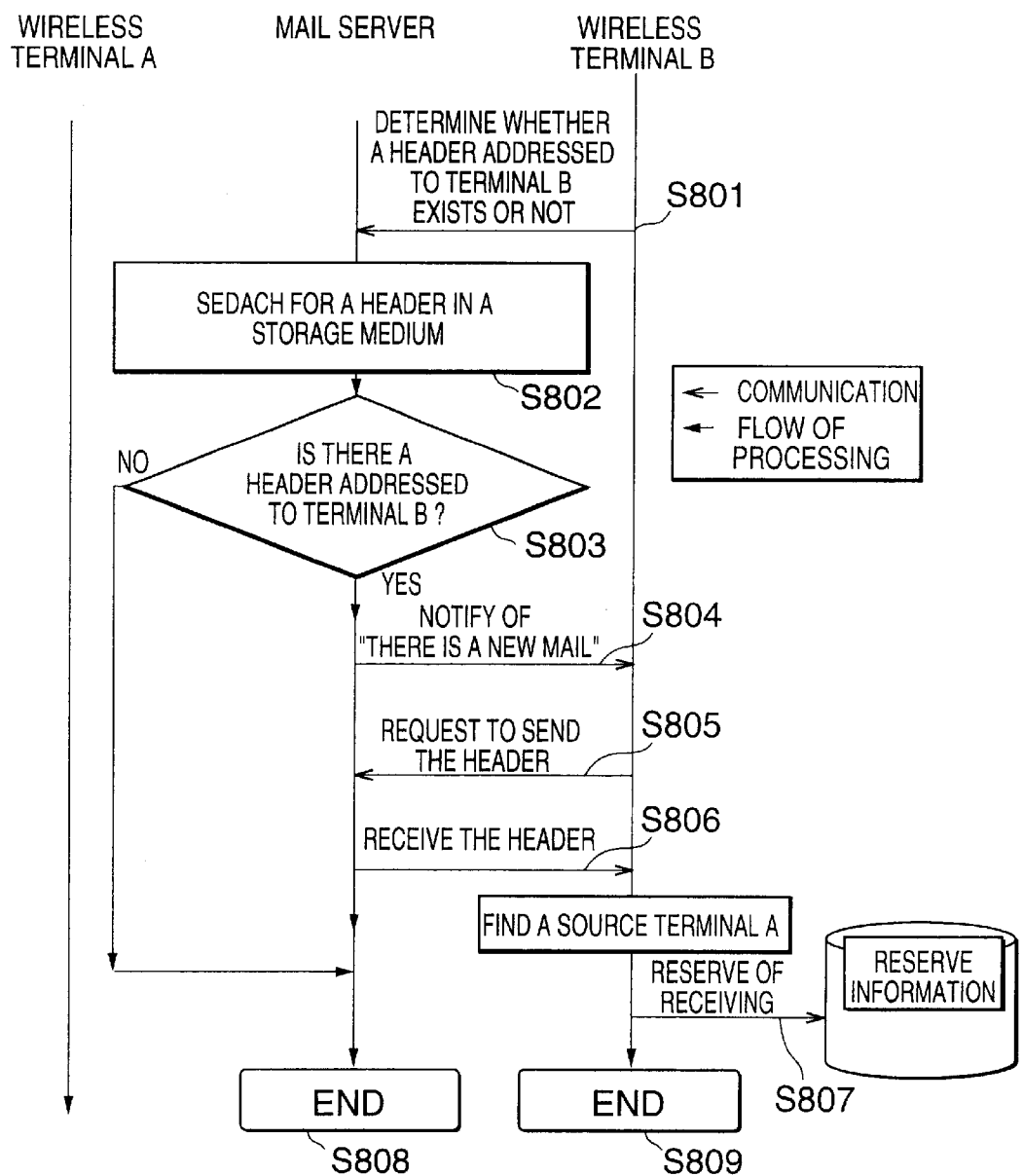
FIG. 8 shows a procedure based on a protocol for receiving a mail header in one embodiment of the invention.

Next, more detail description about the procedure based on the mail header receiving protocol (S504) will be made with reference to FIG. 8. FIG. 8 shows the procedure including steps based on the mail header receiving protocol (S504).

In FIG. 8, the wireless terminal B 103 connects to the mail server 102 in response to a trigger signal, such as a timer interrupt signal (S503). The first step of the procedure based on the mail header receiving protocol (S504) is, in the wireless terminal B 103, to request the mail server 102 to determine whether or not there is a mail header addressed to the wireless terminal B 103 in the mail server 102 (S801).

The mail server 102 searches for a mail header addressed to the wireless terminal B 103 in its storage medium (S802) in response to the request from the wireless terminal B 103 (S801). Here, when no existence is detected about a mail header addressed to the wireless terminal B 103 in the storage medium in the mail server 102, the mail server 102 immediately ends the procedure which is based on the mail header receiving protocol (S504) (S808). Concurrently, also the wireless terminal B 103 ends the procedure (S809).

If the mail server 102 detects a mail header addressed to the wireless terminal B 103 it then notifies the wireless terminal B 103 of existence of a new mail (S804). Next, the wireless terminal B 103 requests the mail server 102 to send this mail header to the wireless terminal B 103 (S805). Then, the mail server 102 sends the mail header to the wireless terminal B 103, and the wireless terminal B 103 receives it (S806). Next, the mail server 102 ends the procedure which is based on the mail header receiving protocol (S504). The series of steps of the procedure are carried out in the mail server 102 by using the mail header sending unit 1107.

The wireless terminal B 103 achieves the series of steps (S801 to S806) by using the mail header receiving unit 1205, and refers to the received mail header by using the mail header analyzing unit 1207 to find that a source terminal of the mail is the wireless terminal A 101. This also means that there is a mail body corresponding to the mail header in the wireless terminal A 101. The wireless terminal B 103 reserves reception of the mail body by using the address of the wireless terminal A 101, which is the address of the source terminal (S807). Reserve information is stored in the storage area in the wireless terminal B 103. After completion of the reservation, the wireless terminal B 103 ends the procedure which is based on the mail header receiving protocol (S504) (S809).

Next, more detail description about the procedure based on the mail body receiving protocol (S505) will be made with reference to FIG. 9 which shows steps included in the procedure which is based on the mail body receiving protocol (S505).

Figure 9:
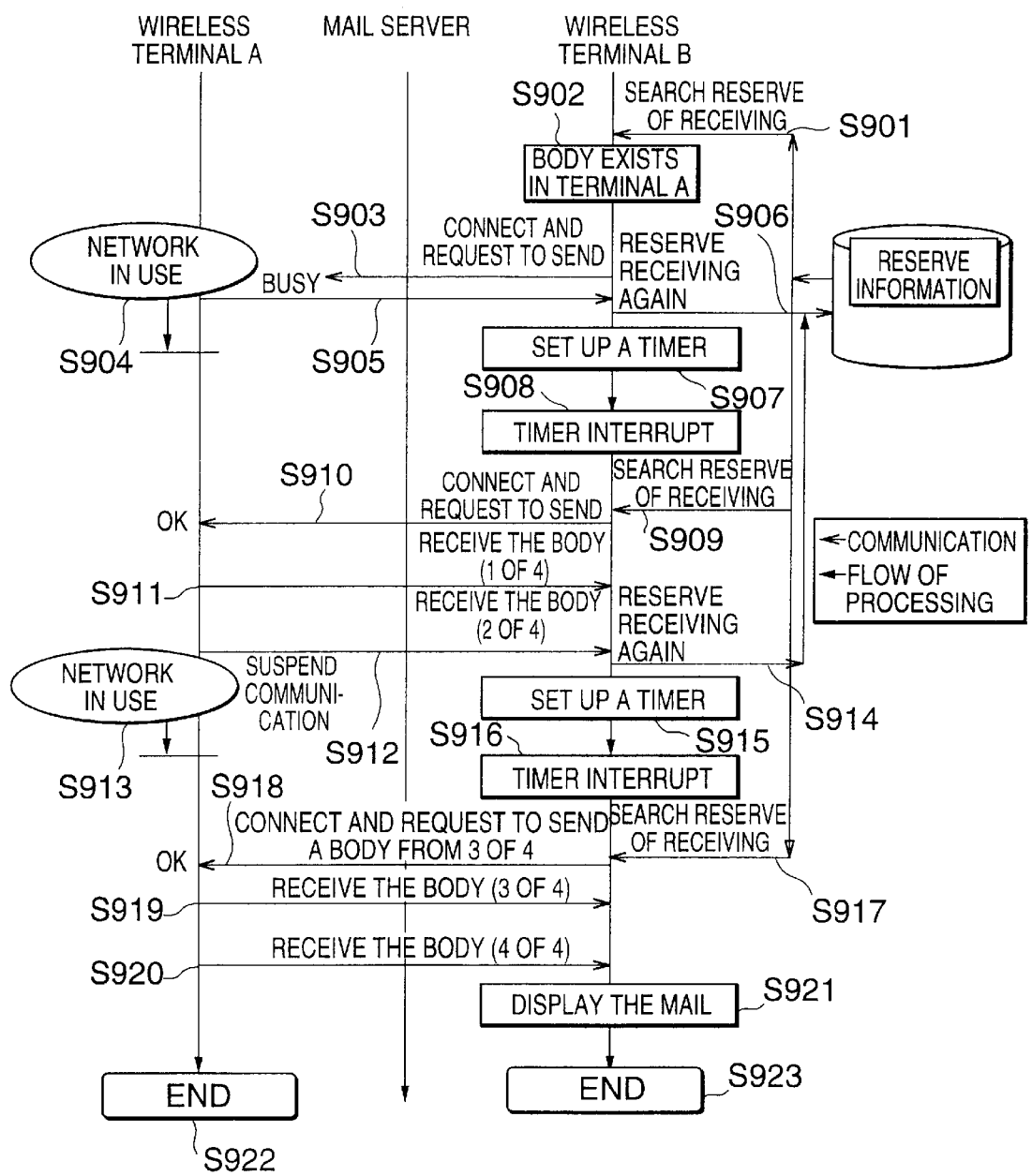
FIG. 9 shows a procedure based on a protocol for receiving a mail body in one embodiment of the invention.

In FIG. 9, it is assumed that it is assumed that the wireless terminal A 101 includes a mail body having an ID which is coincident with an ID (=0×970041E(HEX)) of the mail header addressed to the wireless terminal B 103.

In FIG. 9, when the wireless terminal B 103 detects a mail body addressed to the wireless terminal B 103 in the wireless terminal A 101 by the procedure which is based on the mail header protocol (S504), the wireless terminal B 103 finds that there is a mail body addressed to the wireless terminal B 103 in the mail server 102, it finds that there is a timer interrupt in the wireless terminal B 103, or it receives user's instructions, searches the reserve information and determines whether reserve of receiving exists or not (S901) in the information, i.e. an indication of an earlier unsuccessful mail body retrieval attempt.

The wireless terminal B 103, when it determines that the reserve of receiving exists and the mail body exists in the wireless terminal A 101, immediately connects to the wireless terminal A 101 and requests the wireless terminal A 101 to send the mail body to the wireless terminal B 103 (S903). At this point, when, for example, a user speaks over a wireless network by using the wireless terminal A 101 (S904), connection between the wireless terminal A 101 and the wireless terminal B 103 is failed (S905). The wireless network can fail to be connected when a user who uses the wireless terminal A 101 is using the network, but the wireless terminal A 101 is automatically connected to another mail server, or the wireless terminal A 101 is located out of the area where it can send/receive a radio wave.

The wireless terminal B 103, when it determines the failure of the connection of the wireless network, reserves receiving again (S906) with the determined reserve of receiving (S901). After the reservation, the wireless terminal B 103 sets up a timer 1212 (S907) so that the wireless terminal B 103 determines existence of reserve of receiving for every a certain time (for example, for every one hour) (S909). Next, the wireless terminal B 103 can pause its operation for saving battery power.

The wireless terminal B 103, when it is again activated by timer interrupt (S908), firstly determines reserve of receiving (S909). The wireless terminal B 103 refers to the reserve of receiving, connects to the wireless terminal A 101, and requests the wireless terminal A 101 to send the mail body to the wireless terminal B 103 (S909 to S910) as similar to the steps S901 to S903.

The wireless terminal A 101, when it receives the request from the wireless terminal B 103, searches a mail body corresponding to a mail ID (−0×970041E(HEX)) stored in the wireless terminal A 101 and sends it to the wireless terminal B 103 (S911), which is connected to the wireless terminal A 101 at this point.

In this embodiment, because the size of the mail body (−0×15E0(HEX)=5,600 bytes) exceeds a predetermined size of an unit in sending a mail body (for example, =0×5DC (HEX)=1,500 bytes), the wireless terminal A 101 divides the mail body and sends them. In this embodiment, as shown in FIG. 15, the wireless terminal A 101 divides the mail body 1501 (its size=5,600 bytes) into 4 pieces, each piece has a unit of size (=1,500 bytes). The wireless terminal A 101 further appends a packet header for sending and a corresponding checksum to the each divided piece of the mail body (1502 to 1505) and sends to the wireless terminal B 103. For example, at first the divided mail body 1 (1502) is sent (S911), next the divided mail body 2 (1503) is sent (S912), next the divided mail body 3 (1504) is sent (S918), lastly the divided mail body 4 (1505) is sent (S919). The packet header need not include address information, however, to include the mail ID, the number of the divided mail body, and information representative of what area in the whole mail body the divided mail body corresponds to is convenient to classify the mail body after the wireless terminal B 103 receives it.

Here, the receiving quality monitoring unit 1211 of the wireless terminal B 108 refers to the received mail body packet 1506, calculates a checksum from the divided mail body 1 (1502), and compares it with a checksum in the mail body packet 1506. The wireless terminal B 103, when both the checksums are not identical with each other, requests the wireless terminal A 101 to send the mail body packet again to the wireless terminal B 103, and receives the mail body from the wireless terminal A 101 again.

In FIG. 9, the wireless network used for the wireless terminal A101 can be used for any objects other than communication, after completion of sending (S912) of the divided mail body 2 (1503). Therefore, at this point, communication according to the invention and connection for the communication are suspended. The reason why the communication and the connection for the communication are suspended can be similar to the above reason why the connection of wireless network is failed.

When the wireless terminal B 103 determines that communication and connection for the communication are suspended, it reserves receiving again (S904 to S915) in a manner similar to the above steps (S906 and S907). However, information representative of the fact that the divided mail body 1 and 2 (1502, 1503) have been received should be appended to the reserve of receiving in steps S906 and S907 (S914), because the divided mail body 1 and 2 (1502, 1503) have already been received by the wireless terminal B 103 among the whole mail body 1501.

The wireless terminal B 103 which is activated by timer interrupt (S916) again, firstly determines the reserve of receiving (S917) and detects that there is the reserves of receiving and the wireless terminal B 103 had received divided mail bodies 1 and 2 (1502, 1503). Therefore, the wireless terminal B 103 connects to the wireless terminal A 101 and requests the wireless terminal A 101 to send divided mail bodies except for the divided mail bodies 1 and 2 (1502, 1503) which are of a part of the divided mail bodies 1 and 2 (1502, 1503) which are of a part of the mail body 1501 (S918).

Responsive to the request, the wireless terminal A 101 sends to the wireless terminal B 103 the divided mail bodies 3 and 4 (1504, 1505) (S919, S920). In response to the sending by the wireless terminal A101, the wireless terminal B 103 receives the divided mail bodies 3 and 4 (1504, 1505) (S919, S920). When all of the divided mail bodies have been received, the wireless terminal A 101 ends the procedures based on the mail body receiving protocol (S505) (S922).

The wireless terminal B 103 may reconstruct the received mail bodies 1 to 4 (1502 to 1505) to display them as a single mail body (1501) (S921) by using the mail displaying unit 1204.

If the series of steps in the above description completed, the wireless terminal B 103 ends the procedure based on the mail body receiving protocol (S505) (S923). However, as far as the wireless terminal B 103 reserves receiving and sets up the timer 1212, the other operations can be made by the wireless terminal B 103. For example, after reserve of receiving again (S906) and setting the timer 1212 (S907), and before the timer interrupt (S908), wireless terminal B 103 can activate the procedure based on the mail header receiving protocol (S504). In this case, if there is a new mail header in the mail server 102, the number of the reserve of receiving in the reserve information is incremented by one. When the procedure based on the mail body receiving protocol (S505) are activated by timer interrupt (S908), the wireless terminal B 103 finds that the number of the reserve of receiving is incremented (S909). Then receiving the new mail can be done with no problem by processing mails corresponding to the incremented reserve of receiving one by one.

Heretofore, descriptions about the first embodiment of the invention have been made. Hereinafter, description will be directed to a wireless data transfer system according to a second embodiment of the present invention. In the wireless data transfer system, the wireless terminal B 103 which carries out a procedure based on the mail body receiving protocol (S505) in the first embodiment of the invention can receive a plurality of mail body from a single source terminal in a single connection to a wireless network and can reduce the number of connection to the network by reordering a plurality of reservations of reception by using a source address as a key, when the wireless terminal B 103 determines the reserve information (S901, S909, S917) and, as a result, it is found that there are a plurality of reservations of reception. In other words, if there were several failed retrievals from a single source terminal, sorting by source address permits all mail bodies awaiting delivery from that source terminal during a single connection session.

A third embodiment of the invention is a wireless data transfer system in which the wireless terminal B 103, in a procedure based on the mail body receiving protocol (S505) in the first embodiment and the second embodiment of the invention, when the wireless terminal B 103 intends to connect to the wireless terminal A 101 designated by a source address (S903, S910, S918), determines whether or no t there is sufficient receiving field intensity to use a wireless network by using the receiving quality monitoring unit 1211 before the connection. The situation where there is sufficient field intensity may be referred to as "be in a communication area". Next, the wireless terminal B 103, when it determines that the wireless terminal B 103 is in a communication area, automatically connects to the wireless terminal A 101.

The receiving field intensity is determined to be not enough, when intensity level of a radio wave which is received and monitored at all times falls below a predetermined threshold value. The invention, however, does not intend to define how to measure the intensity level of the radio wave. There, any conventional technologies for measuring the intensity level may be used.

A fourth embodiment of the invention is a wireless data transfer system in which the wireless terminal B 103, in a procedure based on the mail body receiving protocol (S505) in the first embodiment to the third embodiment of the invention, when terminal B 103 intends to connect to the wireless terminal A 101 designated by a source address (S903, S910, S918), it determines whether or not the remainder of its own battery is enough to use a wireless network by using the receiving quality monitoring unit 1211 before the connection. Next, the wireless terminal B 103, when it determines that the remainder of its own battery is enough, automatically connects to the wireless terminal A 101.

The remainder of the battery of the wireless terminal B 103 is determined to be not enough, when voltage of the battery which is monitored at all times falls below a predetermined threshold value. The invention, however, does not intend to define how to measure the voltage of the battery. Therefore, any conventional technologies for measuring the voltage of the battery may be used.

A fifth embodiment of the invention is a wireless data transfer system in which the wireless terminal B 103, in a procedure based on the mail body receiving protocol (S505) in the first embodiment to the fourth embodiment of the invention, during receiving a mail body (S911, S912, S918, S919), determines whether or not receiving quality is degraded in receiving the mail body by using the receiving quality monitoring unit 1211. Next, the wireless terminal B 103, when it determines that the receiving quality is degraded, automatically suspends communication and connection in which the communication has been made, immediately reserves receiving again, i.e., updates the reserve information (S906, S914) and sets up the timer (S907, S915). Then, wireless terminal B 103 responds to Here, the receiving quality monitoring unit 1211 refers to the received mail body packet 1506, calculates checksum from the divided mail body 1 (1502), and compares the checksum with a checksum from the mail body packet 1506. When they are not identical, the receiving quality monitoring unit 1211 requests the wireless terminal A 101 to send the mail body packet again to these wireless terminal B 103, and receives the mail body packet again from the wireless terminal A 101. In the above procedure, the receiving quality monitoring unit 1211 determines that the receiving quality of the mail body packet is not sufficient, when, for example, event that the checksums are not identical occurs five times successively. Since the invention does not intend to define how to calculate checksum, any conventional technologies for calculating checksum may be used.

As described above, according to the invention, center-machine sends/receives only attribute information pertaining to digital data. Furthermore, the center-machine can reduce communication cost wasted on receiving digital data which is unnecessary for user receiving digital data by automatically suspending sending/receiving data when radio field intensity becomes not stable and after that automatically restarting the sending/receiving when the radio field intensity becomes stable. The center-machine also can reduce an amount of resources of wireless transmission network occupied by the whole system.

According to the invention, the center-machine can reduce an amount of storage resources occupied by itself by sending/receiving only attribute information pertaining to digital data.

Further, according to the invention, communication can be automatically suspended according to degradation of a wireless network quality or request for network from a user and automatically restarted when reliable data transfer is guaranteed, as a result, a resource of battery power of the wireless terminal can be saved.

Still further, according to the invention, status of connection between a center-machine and a wireless terminal which is designated as destination of digital data is monitored and when a wireless terminal which has not been connected for any duration is designated as destination, the data is automatically stored in conventional manner in the center-machine. As a result, it is prevented that the digital data is piled up with unsent in the wireless terminal which sends the digital data.

What is claimed is:

1. A method of digital data transfer between terminals via a server in a wireless transmission network, the digital data being comprised of messages, each message being divided into a header that identifies the source and destination terminals for the message, and a message body, the method comprising the steps of:

generating a message at a data source terminal;

sending only the header of the generated message from the data source terminal to the server;

monitoring by at least a second terminal of only the header at the server to identify whether the monitoring terminal is the intended destination of the message corresponding to the monitored header; and initiating retrieval of a message body from the source terminal to the monitoring terminal for which the monitoring terminal is the intended destination terminal as indicated by the monitored header.

2. The method of claim 1, wherein the header includes attribute information concerning the associated message.

3. The method of claim 2, wherein the attribute information includes an ID identifying the source terminal, a size of the digital data, a title of the message and an ID identifying the destination terminal.

4. The method of claim 1, further comprising the step of:

transmitting the entire message from the source terminal for storage at the central server if predetermined conditions exist; and transmitting the message to the destination terminal from the central server on demand.

5. The method of claim 4, further comprising the step of:

storing at the destination terminal reserve information for use in retrieving message bodies intended for the destination terminal before the destination terminal initiates retrieval of the message body from the source terminal, the reserve information being employed in the retrieval of the message.

6. The method of claim 5, further comprising the step of:

receiving by the destination terminal of messages from the source terminals collectively and at every source terminal by sorting the reserve information.

7. The method of claim 5, further comprising the step of:

automatically completing retrieval by the destination terminal of a message from a source terminal within a period of time the reserve information if retrieval of the message from the source terminal has been suspended.

8. The method of claim 1, wherein the predetermined conditions are:

the size of the message is lower than a predetermined value; and the destination terminal has not monitored headers at the central server for a predetermined period of time.

9. The method of claim 1, further comprising the step of:

supplying the message by the source terminal to the destination terminal in divided form, when the destination terminal receives the message from the source terminal and a size of the message exceeds a predetermined value.

10. The method of claim 1, further comprising the step of:

suspending the retrieval of the message, when the destination terminal receives the message from the source terminal, if a predetermined condition with respect to receiving quality is satisfied.

11. The method of claim 10, wherein the predetermined condition is that the power of a battery of the destination terminal is below a predetermined level.

12. The method of claim 10, wherein the condition is that receiving field intensity at the destination terminal is insufficient for effective reception.

13. The method of claim 10, wherein the condition is that a checksum originally appended to the message and a checksum derived from the received message are not identical a predetermined number of times successively.

14. A wireless digital data transfer system comprising:

a plurality of remote terminals and a server connected by a wireless transmission network, the digital data being comprised of messages, each remote terminal being operative to generate messages, the messages being comprised of:

a header that identifies the generating terminal as the source of the message, and a destination terminal for the message; and a message body, each remote terminal being further operative to:

send only the header of a generated message for storage by the server;

monitor only the headers stored at the server to identify whether the monitoring terminal is the intended destination of messages corresponding to the monitored headers; and initiate retrieval of a message body from the generating terminal to the monitoring terminal for which the monitoring terminal is the intended the destination terminal as indicated by the monitored header.

15. A computer readable medium which stores a program operable in a wireless communication system comprised of a plurality of remote terminals and a server, the digital data being comprised of messages, each message being divided into a header that identifies the source and destination terminals for the message and a message body, the program comprising the steps of:

generating a message at a data source terminal;

sending only the header of the generated message from the data source terminal for storage by the server;

monitoring by the remote terminal of only headers stored at the central server to identify whether the monitoring terminal is the intended destination of a message corresponding to a monitored header; and initiating retrieval of the message body from the source terminal to the monitoring terminal for which the monitoring terminal is the intended the destination terminal as indicated by the monitored header.

16. A method of communication in a wireless transmission network including a plurality of terminals and a server, the method being comprised of:

at a first terminal:

generating a message comprised of a header and a content portion, the header including the first information identifying the first terminal as the source of the message, second information identifying a destination terminal for the message, and third information identifying the content of the message;

storing the message;

transmitting the header of the message to the server; and transmitting the content portion of the message to the destination terminal in response to a request;

at the server:

storing a transmitted header; and transmitting a stored header in response to a request, and at a second terminal:

initiating transmission from the server of a stored header which identifies the second terminal as an intended recipient of a message;

displaying the transmitted header for inspection;

initiating transmission from the first terminal of the content portion of a message corresponding to a displayed header; and displaying a message transmitted from the first terminal.

17. A method as described in claim 16, in which a header includes a fourth information identifying the length of a message; and in which the method further comprises, at the server:

initiating transmission of the content portion of a message from a first terminal if the fourth information in a header indicates that the length of a message is below a predetermined value; and storing a transmitted message content portion along with the header thereof.

18. A method as described in claim 17, further including, at the server:

recording information as to when each of the plurality of terminals last initiated transmission of a header from the server;

initiating transmission of the content portion of a message from the first terminal if the fourth information in a header indicates that the length of a message is below a predetermined value; and if the time since the terminal identified by the second information in a header last initiated transmission of a header from the server exceeds a predetermined value; and storing a transmitted message content portion along with the header thereof.

19. A method as described in claim 16, in which transmission of the content portion of a message from a first terminal to the second terminal is suspended if the quality of the transmission channel between the first and second terminals is below a predetermined level.

20. A method as described in claim 16, in which the second terminal is powered by a battery, and wherein transmission of the content portion of a message from a first terminal to the second terminal is suspended if the available batter power at the second terminal is below a predetermined level.

21. A method as described in claim 16, further including:

suspending transmission of the content portion of a message from a first terminal to the second terminal in accordance with predetermined criteria;

identifying as reserved messages those for which transmission to the second terminal has been suspended;

storing information at the second terminal concerning reserved messages reinitiating transmission of the information content of reserved messages after a suspension thereof in accordance with the stored information.

22. A method as described in claim 21, in which the stored information concerning reserved messages includes the source address thereof, and further including:

sorting the stored information according to source address;

initiating a connection session with each of the first terminals in succession for which source addresses are stored; reinitiating transmission of the content portion of all messages from the connected first terminal during the connection session.

23. A method as described in claim 16, in which transmission of a header from the server to a particular terminal is initiated only if at least a predetermined number of headers identify the particular terminal as the destination terminal for a message.

* * * * *